June 24, 1958 J. E. BERRY 2,839,841
INSTRUCTIONAL BUILDING BLOCKS
Filed April 30, 1956 3 Sheets-Sheet 1
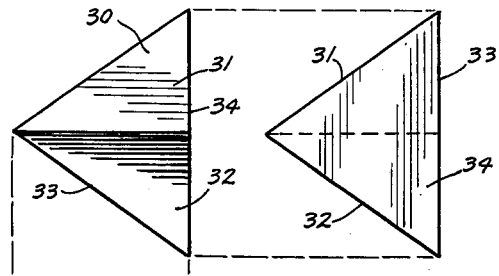
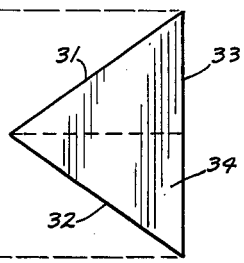
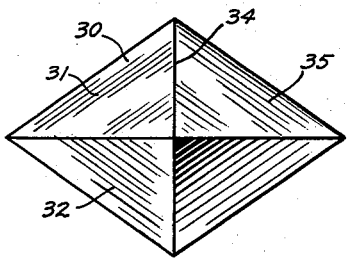
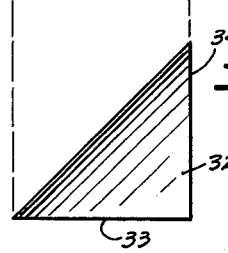
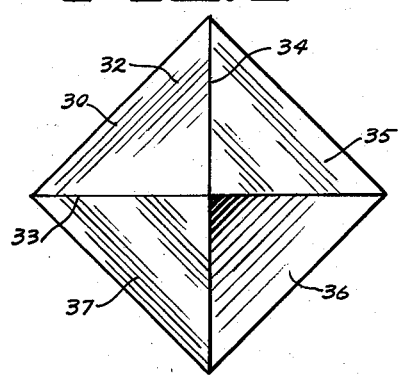
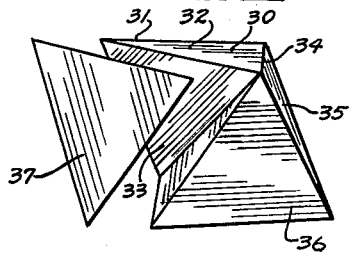
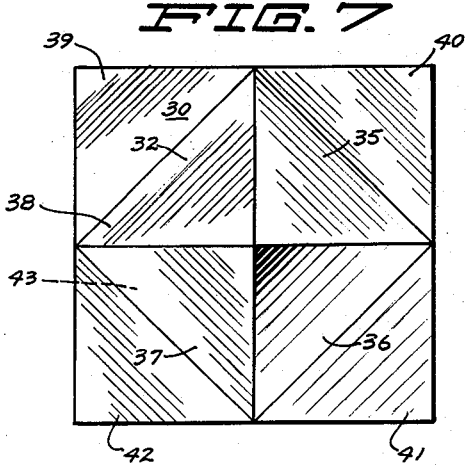
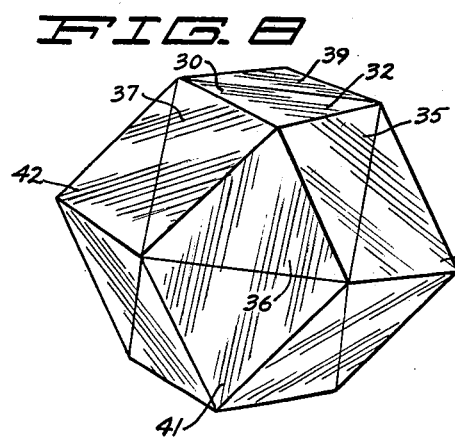
INVENTOR.
JOHN E. BERRY
BY
Braddock and Braddock
ATTORNEYS

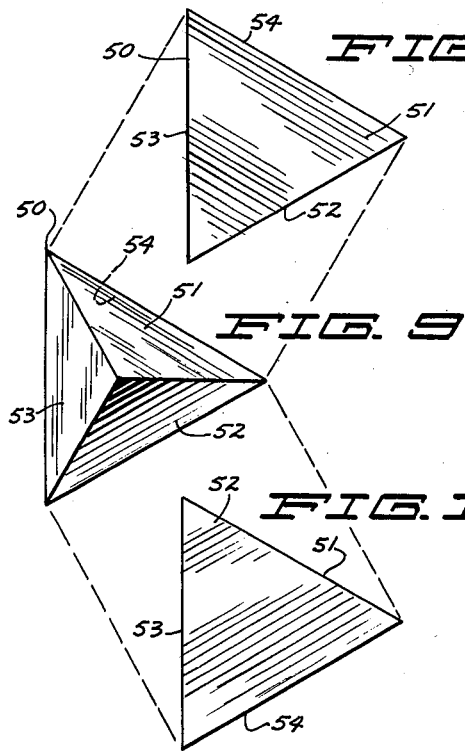
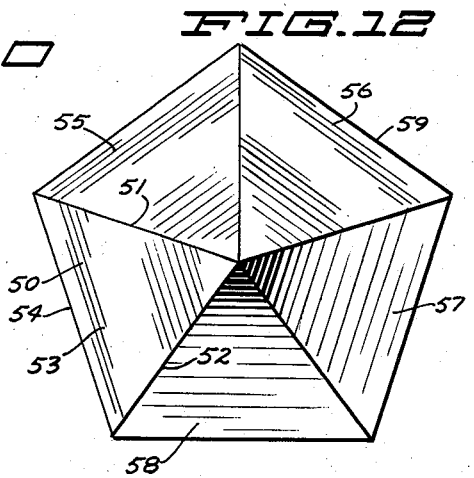
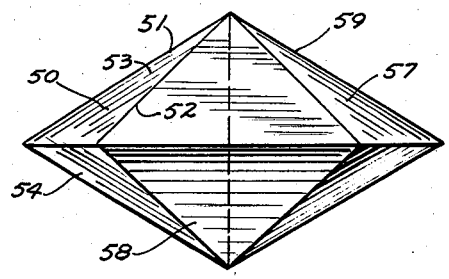
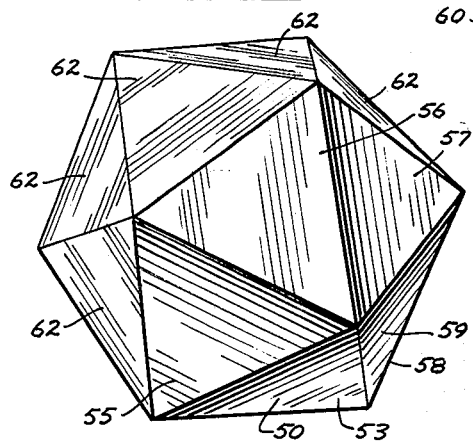
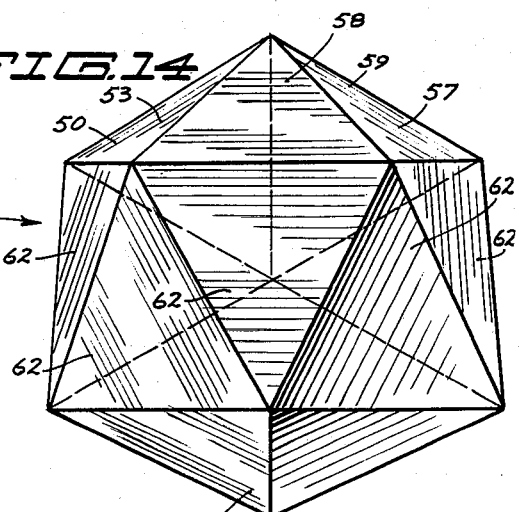

June 24, 1958  J. E. BERRY  2,839,841
INSTRUCTIONAL BUILDING BLOCKS
Filed April 30, 1956  3 Sheets-Sheet 3
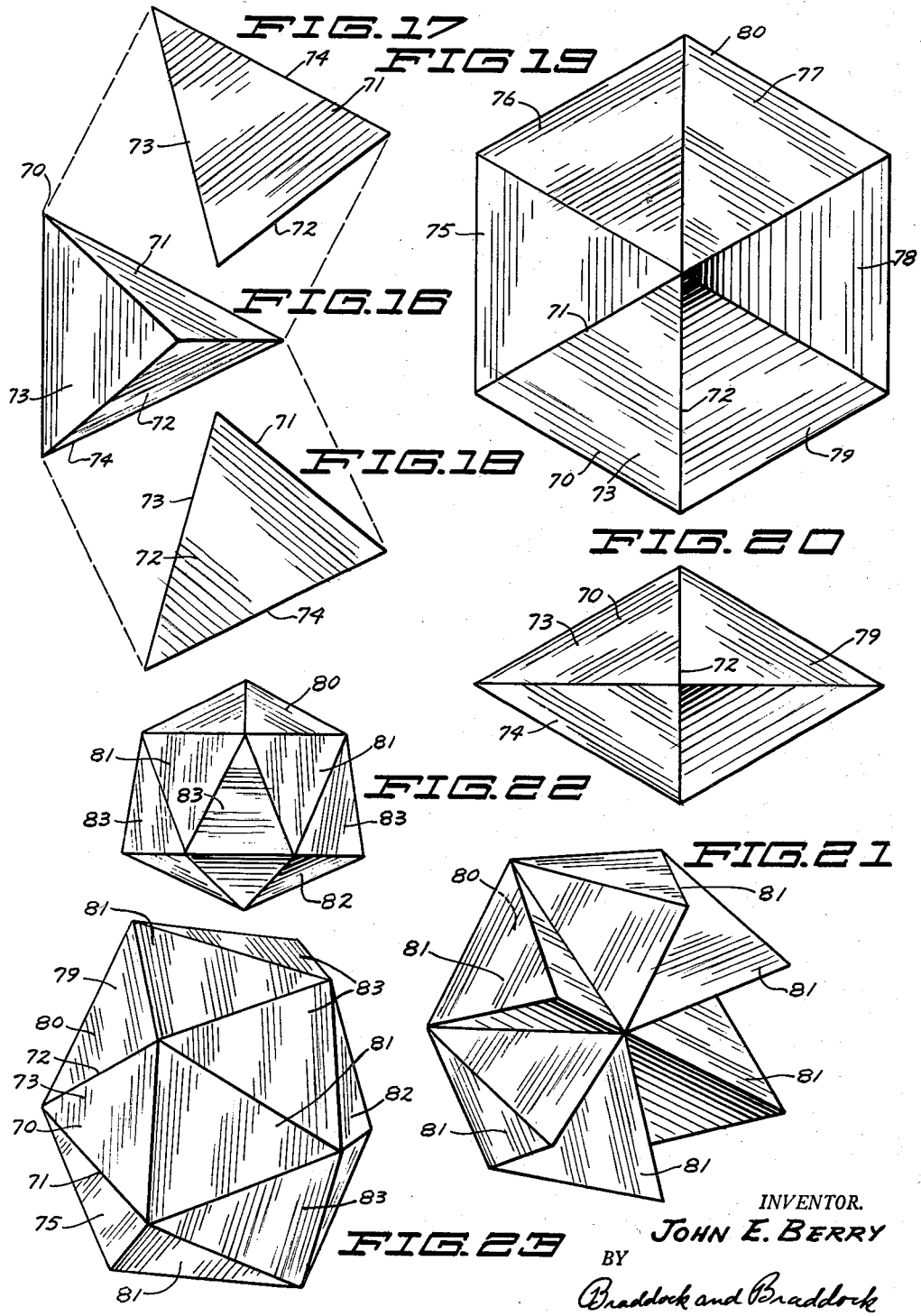
INVENTOR.
JOHN E. BERRY
BY
Braddock and Braddock
ATTORNEYS United States Patent Office 2,839,841
Patented June 24, 1958

2,839,841
INSTRUCTIONAL BUILDING BLOCKS
John E. Berry, Minneapolis, Minn.
Application April 30, 1956, Serial No. 581,470
1 Claim. (Cl. 35—18)

This invention has relation to building blocks constituted as a plurality of identical tetrahedrons which can be assembled with each other to produce solid polyhedrons to explain and demonstrate certain molecular and/or atomic theories.

In one form of the blocks made according to the present invention, four identical tetrahedrons are so proportioned that they can be fitted together at a common line to form a polyhedron having eight faces. In a second form of the invention, five identical tetrahedrons are so proportioned that they can be fitted together along a common line to form a solid tetrahedron having ten faces. In a third form of the invention, six identical tetrahedrons are so proportioned that they can be fitted together along a common line to form a twelve-faced polyhedron.

At the present time, it is the usual practice to try to demonstrate and to visualize atomic and molecular structures by representing these structures as numerous varicolored spheres which can be hooked together in various combinations to indicate how various atoms and molecules will go together to form other molecules. In an instructional aid made according to the present invention, solid tetrahedrons are used as the physical embodiment of the various components of the chemical elements or compound. These tetrahedrons can then be associated with each other to build up the desired molecular structures. Any suitable means can be provided for causing the faces of the tetrahedrons to adhere to each other. For example, each tetrahedron can be constituted as a magnet which will adhere to adjacent tetrahedrons, or one of the tetrahedrons could be constituted as a magnet which would hold other tetrahedrons of magnetic material. Also, the faces of the tetrahedrons can be very accurately ground so that they would be held together by their very smoothness after they had been wrung together. Also, any suitable adhesive can be applied to the faces of the tetrahedrons so that they will adhere to each other. If it is desired to build up a permanent structure for demonstration purposes, the adhesive can be of a type which will permanently affix the surfaces to each other. If, as will usually be the case, the tetrahedrons are merely to be associated with each other temporarily to demonstrate the build up of some structure, the adhesive will be of a nature which will allow the tetrahedrons to be disassociated with each other.

In the drawings,

Fig. 1 is a top plan view of a tetrahedron made according to the first form of the invention;

Fig. 2 is an end elevational view of the tetrahedron as seen from the right side of Fig. 1;

Fig. 3 is a side elevational view of the tetrahedron of Fig. 1;

Fig. 4 is a top plan view of an eight-faced polyhedron made up of four tetrahedrons of Fig. 1 joined together along a common horizontal line;

Fig. 5 is a side elevational view of the polyhedron of Fig. 4;

Fig. 6 is a perspective view of the polyhedron of Fig. 4 with one of the tetrahedrons forming the polyhedron spaced slightly therefrom;

Fig. 7 is a top plan view of the polyhedron of Fig. 4 but with other tetrahedrons added thereto;

Fig. 8 is a perspective view of the polyhedron of Fig. 7;

Fig. 9 is a top plan view of a tetrahedron made according to a second form of the invention;

Fig. 10 is a true projection of one of the faces of the tetrahedron of Fig. 9;

Fig. 11 is a true projection of another face of the tetrahedron of Fig. 9;

Fig. 12 is a top plan view of a ten-faced polyhedron made up of five tetrahedrons as shown in Fig. 9;

Fig. 13 is a side elevational view of the polyhedron of Fig. 12;

Fig. 14 is a side elevational view of a polyhedron made up of two polyhedrons as illustrated in Fig. 13 with other tetrahedrons added thereto;

Fig. 15 is a perspective view of the polyhedron of Fig. 14;

Fig. 16 is a top plan view of a tetrahedron made according to a third form of the invention;

Fig. 17 is a true projection of one of the faces of the tetrahedron of Fig. 16;

Fig. 18 is a true projection of another one of the faces of the tetrahedron of Fig. 16;

Fig. 19 is a top plan view of a twelve-faced polyhedron made up of six tetrahedrons as shown in Fig. 16;

Fig. 20 is a side elevational view of the polyhedron of Fig. 19;

Fig. 21 is a perspective view of six of the tetrahedrons of Fig. 16 as they would appear if they were attached to and extending outwardly from the bottom six surfaces of the polyhedron of Figs. 19 and 20;

Fig. 22 is a side elevational view of a polyhedron made up of two polyhedrons such as disclosed in Fig. 20 and two sets of tetrahedrons such as disclosed in Fig. 21; and Fig. 23 is a perspective view of the polyhedrons of Fig. 22.

Referring now to Figs. 1 through 8 of the drawings and the numerals of reference thereon, in a first form of the invention the basic unit is a tetrahedron 30 which is bounded by identical faces 31, 32, 33 and 34. As disclosed, the faces 31 and 33 intersect the face 34 at an angle of 55 degrees as do the faces 32 and 33. The faces 31 and 32 intersect the face 34 at an angle of 70 degrees. The plane of the face 34 is perpendicular to the plane of the face 33 and the plane of the face 31 is perpendicular to the plane of the face 32. In Figures 4, 5 and 6, the tetrahedron 30 is joined with three other identical tetrahedrons 35, 36 and 37 to form an eight-sided polyhedron 38.

A twelve-sided polyhedron 44 as disclosed in Figs. 7 and 8 is made up of the polyhedron 38 of Figs. 4, 5 and 6 and additional identical polyhedrons 39, 40, 41, 42 and 43. Polyhedron 43 is on the opposite side of the polyhedron 44 from the polyhedron 38.

If the four identical tetrahedrons 30, 35, 36 and 37 are considered to be atoms and when combined to form the eight-sided polyhedron 38 are considered to form a molecule, then when this molecule 38 is combined with the other eight-sided polyhedrons 39, 40, 41, 42 and 43 they may be considered as forming a complex molecule embodied as the twelve-sided polyhedron 44. It is obvious that many other combinations of tetrahedrons and polyhedrons can be joined to the outer surfaces of the twelve-sided polyhedron or molecule 44 to form even more complex so-called molecules.

Referring now to Figs. 9 through 15, in a second form of the invention, a tetrahedron 50 includes identical faces 51, 52, 53 and 54. The angle between the plane of each of these faces and the plane of an adjacent face is 72 degrees. The faces 51 and 54 intersect the face 53 at an angle of 60 degrees as do the faces 51 and 52. The edge boundaries of each of the other faces also form angles of 60 degrees with each other.

The tetrahedron 50 may be combined with identical tetrahedrons 55, 56, 57 and 58 to form a ten-sided polyhedron 59 as disclosed in Figs. 12 and 13.

A twenty-sided polyhedron 60 as disclosed in Figs. 14 and 15 may be formed by combining the ten-sided polyhedron 59 with an identical ten-sided polyhedron 61 and ten tetrahedrons each indicated by the numeral 62.

If the tetrahedron 50 and each of the tetrahedrons identically consituted are considered as atoms, then the ten-sided polyhedron 59 can be considered as a molecule as can the twenty-sided polyhedron 60 and the ten-sided polyhedron 61.

Referring now to Figs. 16 through 23, in a third form of the invention, a tetrahedron 70 includes identical faces 71, 72, 73 and 74. The planes of each of the faces intersect with planes of adjacent faces at an angle of 60 degrees. Faces 74 and 73 intersect face 71 at an angle of 48 degrees. Faces 73 and 72 intersect face 71 at an angle of 66 degrees as do faces 74 and 72.

The tetrahedron 70 can be combined with identical tetrahedrons 75, 76, 78, and 79 to form a twelve-sided polyhedron 80 as disclosed in Figs. 19 and 20.

If six tetrahedrons 81 each identical with the tetrahedron 70 are each attached to one of the faces 74 and the five corresponding bottom faces of the twelve-sided polyhedron 80, the formation as pictured in Fig. 21 will result. If a twelve-sided polyhedron 82 identical with the polyhedron 80 and six tetrahedrons 83 attached to the polyhedron 82 as are the tetrahedrons 81 attached to the polyhedron 80 are combined with the polyhedron 80 and the tetrahedrons 81, a 24-sided polyhedron 84 will result. This polyhedron 84 is illustrated in Figs. 22 and 23.

If the tetrahedron 70 and all of the tetrahedrons identical therewith are considered as atoms, then the polyhedron 80, the polyhedron 82 and the polyhedron 84 can be considered as molecules of varying degrees of complexity. It is obvious that additional tetrahedrons or atoms could be added to any of the structures illustrated and described to illustrate the formation of more complex molecules.

While the present blocks are intended as instructional aids to assist in demonstrating and visualizing and predicting the inter-action of natural forces in the formation of molecules, it is expected that they will also find utility as games or toys which can be built up and taken down by youngsters or by persons not interested in or able to comprehend the relationship of the blocks to the interaction of these natural forces.

What is claimed is:

A plurality of identical tetrahedrons in which the planes of a first two adjacent faces of each tetrahedron make an angle of 60 degrees with each other, in which the planes of a second two faces of each tetrahedron make an angle of 60 degrees with each other, in which each face of each tetrahedron is constituted as an isosceles triangle, and 24 of which tetrahedrons are capable of being fitted together to form a solid, symmetrical, 24 faced polyhedron.

References Cited in the file of this patent

UNITED STATES PATENTS 639,941      Rossi-Diehl  ------------ Dec. 26, 1899

FOREIGN PATENTS 1,999      Great Britain  ------------ Apr. 3, 1897

OTHER REFERENCES

"Molecular Models . . ." in "The Review of Scientific Instruments," August 1953, vol. 24, No. 8, pp. 621–626.